United States Patent
Osako et al.

(10) Patent No.: US 11,088,614 B2
(45) Date of Patent: Aug. 10, 2021

(54) CONDUCTIVE NOISE SUPPRESSOR, POWER CONVERTER, AND MOTOR DEVICE

(71) Applicant: Samsung Electronics Co., Ltd., Suwon-si (KR)

(72) Inventors: Seisaku Osako, Yokohama (JP); Tatsuhisa Shimura, Yokohama (JP); Yasuyuki Yamada, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/612,234

(22) PCT Filed: May 8, 2018

(86) PCT No.: PCT/KR2018/005264
§ 371 (c)(1),
(2) Date: Nov. 8, 2019

(87) PCT Pub. No.: WO2018/208057
PCT Pub. Date: Nov. 15, 2018

(65) Prior Publication Data
US 2020/0321857 A1 Oct. 8, 2020

(30) Foreign Application Priority Data

May 8, 2017 (JP) .............................. JP2017-092623

(51) Int. Cl.
*H02M 1/44* (2007.01)
*H02M 5/458* (2006.01)
(Continued)

(52) U.S. Cl.
CPC ............. *H02M 1/44* (2013.01); *H02M 5/458* (2013.01); *H02P 27/06* (2013.01); *H02M 1/0009* (2021.05)

(58) Field of Classification Search
CPC ................................ H02M 1/44; H02M 5/458
(Continued)

(56) References Cited

U.S. PATENT DOCUMENTS 6,459,597 B1 * 10/2002 Igarashi .................. H02M 1/12
363/34
8,115,444 B2 * 2/2012 De .......................... H02P 27/08
318/801
(Continued)

FOREIGN PATENT DOCUMENTS

CN 202798437 U 3/2013
JP 2008289240 A 11/2008
(Continued)

OTHER PUBLICATIONS

ISA/KR, International Search Report and Written Opinion of the International Searching Authority, International Application No. PCT/KR2018/005264, dated Sep. 11, 2018, 12 pages.

*Primary Examiner* — David Luo (57) ABSTRACT

A conductive noise suppressor for suppressing worsening of noise due to the frequency of conductive common mode noise is suppressed is provided in an embodiment of the disclosure. The suppressor includes a first coil part for detecting a noise current in a common mode flowing through a power supply line for supplying an alternating current, coils serially inserted on the power supply line, a second coil part including a coupling coil magnetically coupled to the coils and a current supplier for supplying a noise current detected by the first coil part and a current set for a voltage generated across the coupling coil to the coupling coil.

14 Claims, 5 Drawing Sheets

(51) Int. Cl.
*H02P 27/06* (2006.01)
*H02M 1/00* (2006.01)
(58) Field of Classification Search
USPC .................................................. 318/494, 495
See application file for complete search history.

(56) References Cited

U.S. PATENT DOCUMENTS

9,595,881 B2 * 3/2017 Ichihara .................. H02M 1/12
2017/0047881 A1 2/2017 Shimura et al.

FOREIGN PATENT DOCUMENTS

JP 2010057268 A 3/2010
JP 2017038500 A 2/2017
WO 2016208762 A1 12/2016

* cited by examiner

CONDUCTIVE NOISE SUPPRESSOR, POWER CONVERTER, AND MOTOR DEVICE

CROSS-REFERENCE TO RELATED APPLICATIONS

This application is a 371 National Stage of International Application No. PCT/KR2018/005264, filed May 8, 2018, which claims priority to Japanese Patent Application No. 2017-092623, filed May 8, 2017, the disclosures of which are herein incorporated by reference in their entirety.

BACKGROUND

1. Field

Embodiments of the disclosure relate to a conductive noise suppressor, a power converter, and a motor device.

2. Description of Related Art

A power converter composed of a converter, an inverter, or the like using semiconductor elements such as a diode bridge or a switching element is used for controlling a motor. The motor controlled by the power converter is used for an air conditioner, a refrigerator, and the like.

Such a power converter generates conductive noise, which propagates on a power line due to operations of the switching element or the like and affects other electronic devices. The conductive noise includes conductive noise (conductive normal mode noise) in normal mode (differential mode) alternately transmitted between power lines, and a common mode conductive noise (conductive common mode noise) transmitted between the power line and ground.

Patent document 1 discloses a leakage current reduction device inserted and connected between a first electrical device and a second electrical device through a connection line. The leakage current reduction device includes a voltage detector, an input filter, a voltage amplifier, and a voltage applier.

The voltage here comprises a main winding and a winding for detecting leakage current. The main winding is inserted and connected between the first electrical device and the second electrical device through the connection line, and detects a leakage current flowing through the connection line for a detection voltage by the winding for detecting leakage current.

The detection voltage is inputted to the input filter, and the input filter adjusts the magnitude and phase of the detection voltage for each frequency and outputs the result.

The voltage amplifier amplifies the result output from the input filter and outputs the amplified as an output voltage.

The voltage applying means generates an application voltage for reducing the leakage current on the connection line based on the output voltage of the voltage amplifier.

[Patent Document 1] Japanese Patent Publication No. 5528543

SUMMARY

The level of the conductive noise is regulated by the standards of the Committee International Special des Perturbations Radioelectriques (CISPR), so a technique for suppressing the conductive noise to below an allowable value is required.

However, in the case of suppressing the conductive common mode noise by a current flowing through a coil inserted in series with a power line, the conductive common mode noise of a high frequency component might rather be deteriorated due to a phase difference caused by delay of the amplifying circuit which has the current flow in the coil.

An object of the disclosure is to provide a conductive noise suppressor for suppressing worsening of noise due to the frequency of conductive common mode noise.

For this purpose, in accordance with an aspect of the disclosure, a conductive noise suppressor includes a current detector configured to detect a noise current flowing through a power line supplying an alternating current, a noise suppressor configured to include a coil connected to the power line in series and a coupling coil magnetically connected to the coil, and reduce the noise current flowing through the power line by causing a current supplied to the coupling coil to be induced and a current supplier configured to set a current for supplying to the coupling coil based on the detected noise current by the current detector and a voltage at both ends of the coupling coil and supply the set current to the coupling coil.

In such a conductive noise suppressor, the current supplier may be characterized in that for supplying a current, which is suppressed in dependence on the voltage of the connection point of the coupling coil, to the coupling coil through the resistor.

Further, the noise suppressor may be characterized in that the current induced in the power supply line coil by the current flowing through the coupling coil changes the impedance of the power supply line so as to reduce the noise current in the common mode.

Further, the current detector includes a coil connected adjacently with the AC power source, and be connected in series with the power line and a detection coil magnetically coupled to the coil of the other power line and detecting the noise current in a common mode.

In accordance with an aspect of the disclosure, a power converter includes a suppressor configured to reduce a noise current in a common mode flowing through a power line for supplying alternating current, a rectifier configured to rectify the alternating current supplied through the suppressor to output a ripple current, a smoother configured to be connected to the rectifier and generate a direct current by smoothing the ripple current and an inverter configured to be connected to the smoother and convert the direct current into alternating current by performing a switching operation and output the converted alternating current to a load.

Further, the suppressor may include a current detector configured to detect the noise current flowing through the power line, a noise suppressor configured to supply a current to reduce the noise current, and a current supplier configured to set a current for supplying to the noise suppressor based on the detected noise current and the voltage across the noise suppressor and supply the set current to the noise suppressor.

In accordance with an aspect of the disclosure, a motor includes a suppression unit which suppresses the noise current of the common mode which flows through the power supply line which supplies alternating current. Further, the motor includes a rectifier configured to rectify the alternating current supplied through the conductive noise suppressor to output a ripple current, a smoother configured to be connected to the rectifier and generate a direct current by smoothing the ripple flow, an inverter configured to be connected to the smoother and convert the direct current into an alternating current by switching operation and output the converted alternating current to a load, and a motor configured to be connected to the inverter and be driven by the alternating current outputted by the inverter.

Also, the suppression unit includes a current detector detecting the noise current of common mode flowing through the power line. Further, the suppression unit includes a power supply coil inserted in series with the power supply line, and a coupling coil magnetically coupled to the power supply coil, and noise suppressor for suppressing the noise current by the current supplied to the coupling coil. Further, the suppression unit includes a current supplier for supplying a coupling coil with a current set by the noise current detected by the current detector and a voltage generated in the coupling coil in the noise suppressor.

Advantageous Effects

According to the disclosure, a conductive noise suppressor or the like for suppressing worsening of noise due to the frequency of conductive common mode noise may be provided.

DETAILED DESCRIPTION

Hereinafter, embodiments of the disclosure will be described in detail with reference to an accompanying drawings. A motor device as will be described in the following embodiments of the disclosure may be provided in a compressor of e.g., an air conditioner or a refrigerator.

First Embodiment

Motor Device

Figure 1:
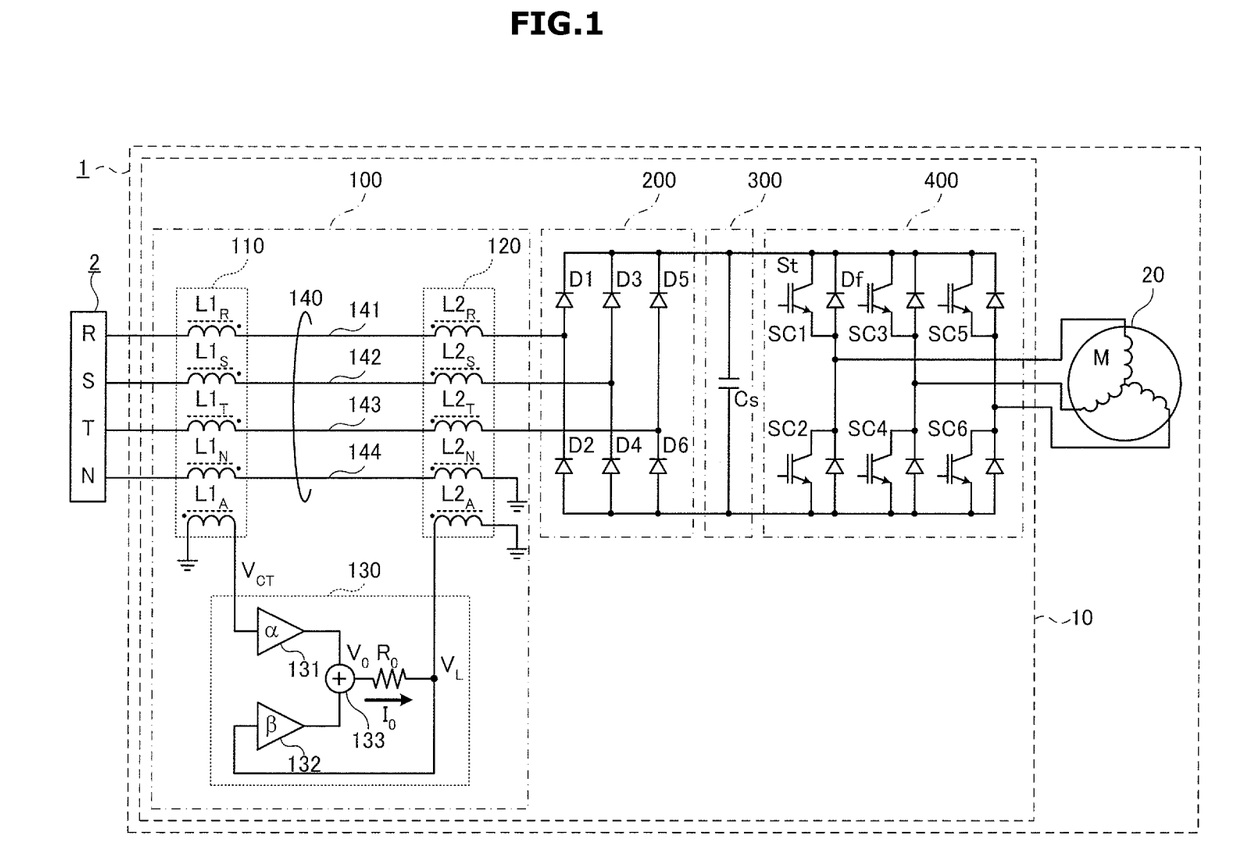
FIG. 1 illustrates a motor device in accordance with an embodiment of the disclosure.

FIG. 1 illustrates a motor device in accordance with a first embodiment of the disclosure.

A motor device 1 may be connected to a three-phase four-wire alternate current (AC) power supply 2 having a neutral phase (N phase).

Here, first to third phases are denoted by R phase, S phase, and T phase. Power lines for supplying R, S, T, and N phase power from the AC power supply 2 are denoted as an R phase power line 141, an S phase power line 142, a T phase power line 143, and an N phase power line 144. Without distinguishing the phases, they may be collectively denoted as a power line 140. Even when coils in the first coil part 110 and the second coil part 120 as will be mentioned later are inserted in series, the name power line 140 remains the same.

A motor device 1 includes a power converter 10 and a motor 20.

The motor 20 may be driven by three-phase AC current supplied by the inverter 400 of the power converter 10 as will be described below.

The motor 20 may be, for example, a direct current (DC) brushless motor, or another kind of three-phase AC motor.

The power converter 10 includes a suppressor 100 for suppressing conductive noise and a rectifier 200 for rectifying an AC current supplied from the AC power supply 2 into a DC current.

The power converter 10 also includes a smoother 300 for smoothing the DC current output from the rectifier 200, and an inverter 400 for converting the smoothed DC current into a three-phase AC current and supplying the three-phase AC current to the motor 20.

As shown in FIG. 1, some terminals of the suppressor 100, the rectifier 200, the smoother 300, and the inverter 400 are grounded. Here, the ground having a potential set to a reference potential.

In the power converter 10, the suppressor 100, rectifier 200, smoother 300, and inverter 400 are connected in sequence from the AC power supply 2. The inverter 400 is connected to the motor 20.

The suppressor 100 mainly suppresses conductive common mode noise (hereinafter, referred to as common mode noise), but also suppresses conductive normal mode noise. That is, the suppressor 100 suppresses conductive noise. The suppressor 100 will be described later in detail.

The suppressor 100 is an example of a conductive noise suppressor.

The rectifier 200 includes, for example, a diode bridge including six rectifying diodes D1 to D6. The six rectifier diodes D1 to D6 rectify the AC current supplied from the AC power supply 2 into DC current. Without distinguishing the rectifying diodes D1 to D6, the rectifying diodes D1 to D6 may be denoted as rectifying diodes D.

The smoother 300 includes a smoothing capacitor (smooth capacitor, Cs).

The smoothing capacitor Cs is connected between a high voltage side (upper line of FIG. 1) of the rectifier 200 and a reference voltage side (lower line of FIG. 1).

The inverter 400 includes six switching circuits SC1 to SC6 each having a switching element St and a feedback diode Df. Without distinguishing the switching circuits SC1 to SC6, each of the switching circuits SC1 to SC6 may be denoted as a switching circuit SC.

In the switching circuit SC, the switching circuit SC1 of the upper arm and the switching circuit SC2 of the lower arm are connected in series, and a connection point is connected to a terminal of the motor 20.

The switching circuit SC1 of the upper arm and the switching circuit SC2 of the lower arm connected in series are provided between the wiring on the high voltage side and the wiring on the reference voltage side. In the similar manner, the other switching circuits SC3 to SC6 are connected.

The switching element St may be a power field effect transistor or an insulated gate bipolar transistor (IGBT).

Operation of the motor device 1 according to the first embodiment will now be described.

The commercial AC power supply 2 supplies an AC voltage to the rectifier 200 through a suppressor 100 that suppresses conductive noise.

The rectifier 200 rectifies the AC voltage supplied from the AC power supply 2 into a DC voltage by the rectifying diodes D1 to D6 connected in a bridge shape to generate a ripple current. The smoother 300 generates a DC current by smoothing the ripple current from the rectifier 200 using a smoothing capacitor (Cs). The inverter 400 converts the DC current smoothed by the smoother 300 into an AC current by on/off control of the switching element St of the switching circuit SC and supplies the AC current to the motor 20.

In FIG. 1, a controller which controls on/off of switching element St is not shown.

Suppressor 100

The suppressor 100 is an active conductive noise suppression circuit which detects common mode noise occurring in the power line 140 and suppresses the common mode noise by feeding back a signal corresponding to the detected common mode noise. Based on the suppressor 100, the AC power supply 2 is indicated in the upper stream, and the rectifier 200 is indicated in the lower stream.

The suppressor 100 includes a first coil part 110, a second coil part 120, and a current supplier 130.

The first coil part 110 and the second coil part 120 are sequentially connected in series with the power line 140 from the AC power supply 2. Specifically, the first coil part 110 is connected to the AC power supply 2, and the second coil part 120 is connected to the rectifier 200.

The current supplier 130 is connected to the first coil part 110 (detection coil L1A as will be described later) and the second coil part 120 (combination coil L2A as will be described later). The current supplier 130 of FIG. 1 is conceptually shown to describe operation of the current supplier 130.

The first coil part 110 is an example of a current detector, the second coil part 120 is an example of a noise suppressor, and the current supplier 130 is an example of a current supplier means.

The first coil part 110 includes coils (i.e., windings) $L1_R$, $L1_S$, $L1_T$, and $L1_N$ connected in series to the power lines 141 to 144 of the R, S, T, and N phases, respectively. Specifically, the first coil part 110 may include a detection coil $L1_A$ magnetically coupled with the coils $L1_R$, $L1_S$, $L1_T$, and $L1_N$, for detecting common mode noise.

Here, without distinguishing the coils $L1_R$, $L1_S$, $L1_T$, and $L1_N$, they may be referred to as coils L1. Furthermore, the coil L1 may sometimes be referred to as having the detection coil $L1_A$.

Here, the term coil refers to a conductive wire that is wound in a spiral (loop) shape to constitute an inductor.

The coils $L1_R$, $L1_S$, $L1_T$, $L1_N$ are examples of power line coils.

The coils $L1_R$, $L1_S$, $L1_T$, $L1_N$ are conducting wires (wires) constituting a part of the power supply lines 141 to 144. For example, the coils $L1_R$, $L1_S$, $L1_T$, $L1_N$ may be wound around one toroidal core.

The toroidal core includes a magnet such as ferrite in an annular shape (donut-shape) having a circular cross section. The toroidal core is sometimes called an iron core.

In addition, the toroidal core may be provided in a frame shape of a polygon such as a rectangle or a triangle in addition to the annular shape. For example, it is possible for the toroidal core to have a square or triangular cross section.

The coils $L1_R$, $L1_S$, $L1_T$, and $L1_N$ are wound around the single toroidal core to be adjacent to each other. Accordingly, the coils $L1_R$, $L1_S$, $L1_T$, and $L1_N$ may be magnetically coupled to each other. In addition, the coils $L1_R$, $L1_S$, $L1_T$, $L1_N$ may also be wound with a polarity indicated by "•" as shown in FIG. 1.

The detection coil $L1_A$ may be installed to be magnetically coupled to the coils $L1_R$, $L1_S$, $L1_T$, and $L1_N$.

The detection coil L1A may be wound, for example, on one toroidal core to be adjacent to the coils $L1_R$, $L1_S$, $L1_T$, and $L1_N$. It is also possible for the detection coil L1A to be wound to overlap the coils $L1_R$, $L1_S$, $L1_T$, and $L1_N$ which are wound on the single toroidal core to be adjacent to each other. In addition, the detection coil $L1_A$ may be wound to have the polarity indicated by "•" as shown in FIG. 1.

A terminal of the detection coil $L1_A$ is connected to the current supplier 130 as will be described later. The other terminal of the detection coil $L1_A$ is grounded.

As described above, the coils $L1_R$, $L1_S$, $L1_T$, and $L1_N$ may be part of the power lines 141 to 144 through which the current of the AC power supply 2 flows.

The coils $L1_R$, $L1_S$, $L1_T$, and $L1_N$ may be formed of conductive wires (wires) having thickness corresponding to the current flowing therein. On the other hand, a current induced by the common mode noise occurring in the coils $L1_R$, $L1_S$, $L1_T$, and $L1_N$ flows through the detection coil $L1_A$ as will be described later. Accordingly, the detection coil $L1_A$ may be formed of a conductive wire as thick as to endure (or detect) a current induced by the common mode noise.

The common mode noise occurring in the coils $L1_R$, $L1_S$, $L1_T$, and $L1_N$ is referred to as a common mode noise current. It may also be referred to as a noise current.

In addition, the coils $L1_R$, $L1_S$, $L1_T$, and $L1_N$ may have the same inductance.

The common mode noise current is a high frequency current leaking to the ground through stray capacitance of the motor 20 or the like by switching of the switching element St of the inverter 400.

Therefore, the common mode noise current flows in the same direction and in the same phase between the power supply lines 141 to 144 of the R phase, S phase, T phase, N phase and the ground.

The coils $L1_R$, $L1_S$, $L1_T$, and $L1_N$ serving as inductors act as a resistor to the common mode noise current which is a high frequency signal. Therefore, the coils $L1_R$, $L1_S$, $L1_T$, and $L1_N$ suppress (reduce) the common mode noise. The coils $L1_R$, $L1_S$, $L1_T$, and $L1_N$ may not suppress all the common mode noise.

When the common mode noise current flows through the coils $L1_R$, $L1_S$, $L1_T$, and $L1_N$, a current proportional to the common mode noise current is induced to the detection coil $L1_A$ through the toroidal core.

Specifically, the first coil part 110 and the detection coil $L1_A$ perform a function as a current transformer and a function as a detection transformer for detecting the common mode noise current.

The second coil part 120 includes coils $L2_R$, $L2_S$, $L2_T$, and $L2_N$ connected in series to the power lines 141 to 144 of the R, S, T, and N phases, respectively. In addition, the second coil part 120 includes a coupling coil L2A magnetically coupled to the coils $L2_R$, $L2_S$, $L2_T$, and $L2_N$.

Without distinguishing the coils $L2_R$, $L2_S$, $L2_T$, and $L2_N$, the coils $L2_R$, $L2_S$, $L2_T$, and $L2_N$ may be referred to as coils L2. The coil L2 may be also referred to as having the coupling coil $L2_A$.

The coils $L2_R$, $L2_S$, $L2_T$, and $L2_N$ are examples of other power line coils. The coils $L2_R$, $L2_S$, $L2_T$, and $L2_N$ are conducting wires that form part of the power supply lines 141 to 144, and are similar to the coils L1R, L1S, L1T, and L1N of the first coil part 110.

Specifically, the coils $L2_R$, $L2_S$, $L2_T$, and $L2_N$ may be wound on another toroidal core. Accordingly, the coils $L2_R$, $L2_S$, $L2_T$, and $L2_N$ may be magnetically coupled to each other. In addition, the coils $L2_R$, $L2_S$, $L2_T$, and $L2_N$ may be wound to have a polarity indicated by "•" as shown in FIG. 1.

The coupling coil $L2_A$ may be installed to be magnetically coupled to the coils $L2_R$, $L2_S$, $L2_T$, and $L2_N$.

The coupling coil $L2_A$ may be similar or identical to the detection coil $L1_A$ of the first coil part 110.

The coupling coil $L2_A$ may be wound, for example, on the toroidal core to be adjacent to the coils $L2_R$, $L2_S$, $L2_T$, and $L2_N$. It is also possible for the coupling coil L2A to overlap the coils $L2_R$, $L2_S$, $L2_T$, and $L2_N$ which are wound on the toroidal core to be adjacent to each other. In addition, the coupling coil $L2_A$ may be wound to have a polarity indicated by "•" as shown in FIG. 1.

A terminal of the coupling coil $L2_A$ is connected to a current supplier 130 and the other terminal of the detection coil $L2_A$ is grounded.

As described above, the coils $L2_R$, $L2_S$, $L2_T$, and $L2_N$ may be part of the power lines 141 to 144 through which the current of the AC power supply 2 flows. Therefore, the coils $L2_R$, $L2_S$, $L2_T$, and $L2_N$ may be formed of conductive wires (wires) having thickness corresponding to the flowing current.

On the other hand, as will be described later, a current amplified by the current supplier 130 flows in the coupling coil $L2_A$. Accordingly, the coupling coil $L2_A$ may be formed of a conductive wire (wire) which is as thick as to endure the current amplified by the current supplier 130.

In addition, the coils $L2_R$, $L2_S$, $L2_T$, and $L2_N$ may have the same inductance.

The inductor coils $L2_R$, $L2_S$, $L2_T$, and $L2_N$ may be implemented in the same or similar manner as the coils $L1_R$, $L1_S$, $L1_T$, and $L1_N$ of the first coil part 110. That is, the coils $L2_R$, $L2_S$, $L2_T$, and $L2_N$ serving as inductors may act as a resistor to the common mode noise current. Therefore, the coils $L2_R$, $L2_S$, $L2_T$, and $L2_N$ may suppress (reduce) the common mode noise. Like the first coil part 110, the second coil part 120 may not suppress all the common mode noise.

The current supplier 130 includes amplifying circuits 131 and 132, an adding circuit 133, and a resistor $R_O$.

An input terminal of the amplifying circuit 131 may be connected to a terminal of the detection coil $L1_A$. Also, the other terminal of the detection coil $L1_A$ may be grounded.

An input terminal of the amplifying circuit 132 may be connected to a terminal of the coupling coil $L2_A$. Also, the other terminal of the coupling coil $L2_A$ may be grounded.

An adding circuit 133 includes two input terminals. Each of the two input terminals of the adding circuit 133 may be connected to an output terminal of the amplifying circuit 131 and an output terminal of the amplifying circuit 132.

The output terminal of the adding circuit 133 may be connected to a terminal of the resistor R0. The other terminal of the resistor R0 may be connected to a terminal of the coupling coil L2A.

Hereinafter, operation of the suppressor 100 will now be described.

The suppressor 100 sets a current to flow in the coupling coil L2A based on the common mode noise current detected by the detection coil L1A.

The current flowing through the coupling coil $L2_A$ induces a current to the coils $L2_R$, $L2_S$, $L2_T$, and $L2_N$ of the second coil part 120, which are magnetically coupled to the coupling coil $L2_A$. Specifically, as the current flows through the coupling coil $L2_A$, current flows in the power lines 141 to 144 through the coils $L2_R$, $L2_S$, $L2_T$, and $L2_N$ of the second coil part 120.

Accordingly, in the power lines 141 to 144, there is a superposition of the current from the AC power supply 2 and the current induced by the coupling coil $L2_A$. That is, the impedance of the power supply lines 141 to 144 changes. At this time, the common mode noise current may be suppressed by making the direction of the current induced by the coupling coil $L2_A$ reverse to the common mode noise current.

And, as will be described later, a voltage generated in the coupling coil (L2A) is fed back to the current supplier 130, the current induced by the coupling coil L2A to the coils $L2_R$, $L2_S$, $L2_T$, and $L2_N$ of the second coil part 120 may follow the common mode noise current.

Specifically, the current induced by the coupling coil L2A to the coils $L2_R$, $L2_S$, $L2_T$, and $L2_N$ of the second coil part 120 follows the magnitude, frequency, and phase of the common mode noise current. The current induced to the coils $L2_R$, $L2_S$, $L2_T$, and $L2_N$ of the second coil part 120 by the coupling coil $L2_A$ hardly makes a phase difference with the common mode noise current and suppresses (reduces) the frequency dependency. Therefore, the common mode noise current is efficiently suppressed, and the other current than the common mode noise current may be hardly inhibited.

On the other hand, if a phase difference occurs between the current induced to the coils $L2_R$, $L2_S$, $L2_T$, and $L2_N$ of the second coil part 120 and the common mode noise current, the frequency worsens the noise. In particular, the high frequency component rather worsens the noise.

By making it difficult to have a phase difference between the current induced to the coils $L2_R$, $L2_S$, $L2_T$, and $L2_N$ of the second coil part 120 and the common mode noise current, noise worsening due to frequency is suppressed.

A process to have a current for suppressing the common mode noise current flow to the coupling coil $L2_A$ is as follows:

First, common mode noise currents of the power lines 141 to 144 of the R phase, the S phase, the T phase, and the N phase are detected using the detection coil $L1_A$ of the first coil part 110.

A voltage $V_{CT}$ (hereinafter, a detection voltage $V_{CT}$) detected by the detection coil L1A is input to the input terminal of an amplifying circuit 131 of the current supplier 130. The amplifying circuit 131 outputs, through the output terminal, an output $\alpha \cdot V_{CT}$ obtained by multiplying the detection voltage $V_{CT}$ input to the input terminal by $\alpha$ (amplification factor $\alpha$).

On the other hand, a voltage VL (hereinafter referred to as a coupling voltage VL) detected across both ends of the coupling coil $L2_A$ is input to the input terminal of the amplifying circuit 132. The amplifying circuit 132 outputs, through the output terminal, an output $\beta \cdot VL$ obtained by multiplying the coupling voltage VL input to the input terminal by $\beta$ (amplification factor $\beta$).

The adding circuit 133 adds the output ($\alpha \cdot V_{CT}$) of the amplifying circuit 131 to the output ($\beta \cdot VL$) of the amplifying circuit 132 and outputs the resultant output $V_O$. That is, the output $V_O$ is represented by equation (1).

Here, it is assumed that a current $I_O$ flows through the resistor $R_O$. The current $I_O$ is represented by equation (2). From equations (1) and (2), the current $I_O$ may be expressed by equation (3).

$$V_o = \alpha \cdot V_{CT} + \beta \cdot V_L \qquad (1)$$

$$I_O = \frac{V_O - V_L}{R_O} \qquad (2)$$

$$I_O = \frac{\alpha \cdot V_{CT} + \beta \cdot V_L - V_L}{R_O} \qquad (3)$$

Here, assuming β=1, equation (3) may be expressed by equation (4). The current $I_O$ does not depend on the coupling voltage VL. That is, the current $I_O$ may be a current (constant current) output from the current source. That is, the current supplier 130 may perform a function as a current source (constant current source).

$$I_O = \frac{\alpha \cdot V_{CT}}{R_O} \quad (4)$$

As such, as the current supplier 130 functions as a current source, the coupling coil $L2_A$ does not act as a load of the power lines 141 to 144.

Therefore, the impedance of the power supply lines 141 to 144 hardly decreases, and is hardly influenced. That is, even if the coupling voltage VL fluctuates, fluctuations in the current flowing through the coupling coil $L2_A$ may be suppressed. Therefore, the fluctuation of the current induced to the coils $L2_R$, $L2_S$, $L2_T$, and $L2_N$ may be suppressed.

When the current flows through the coupling coil $L2_A$ from a voltage source, the impedance of the coupling coil $L2_A$ needs to be reduced. Therefore, the coupling coil $L2_A$ may be alternately grounded, thereby reducing the impedance of the power supply lines 141 to 144.

As described above, in the first embodiment, the suppressor 100 is provided and the common mode noise current is detected by the detection coil $L1_A$ of the first coil part 110. The common mode noise current is suppressed by allowing a current for suppressing the common mode noise current to flow through the coupling coil $L2_A$ of the second coil part 120.

In addition, the current supplier 130 of the suppressor 100 may function as a current source so that current $I_O$ may flow without depending on the coupling voltage $V_L$ induced to the coupling coil $L2_A$.

Figure 2:
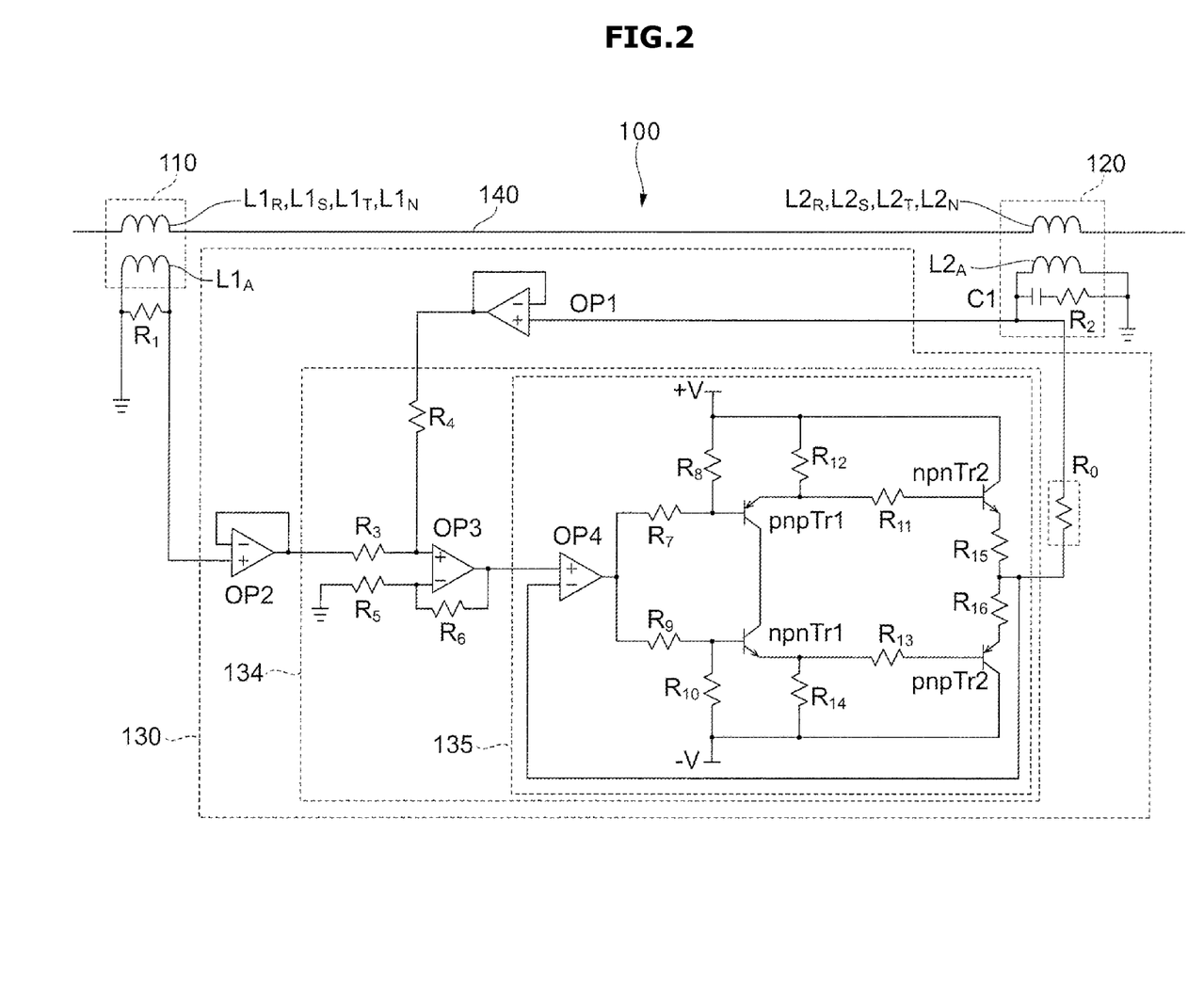
FIG. 2 is a circuit diagram of a suppressor.

FIG. 2 is a circuit diagram illustrating an example of a circuit configuration of the suppressor 100.

The suppressor 100 includes a resistor $R_1$ provided between both terminals of the detection coil $L1_A$ of the first coil part 110. The suppressor 100 converts a current flowing through the detection coil $L1_A$ into a voltage by using the resistor $R_1$.

In addition, the suppressor 100 is provided between both terminals of the coupling coil $L2_A$ of the second coil part 120 and includes a snubber circuit having a resistor $R_2$ and a capacitor $C_1$ connected in series. Here, the snubber circuit removes noise in the frequency band higher than the frequency band of the common mode noise current that is to be suppressed by the suppressor 100.

In addition, the current supplier 130 receives a positive voltage+ V and a negative voltage –V from a power supply circuit (not shown). That is, the current supplier 130 operates by receiving the positive voltage and the negative voltage. Hereinafter, the positive voltage +V and the negative voltage –V may be interchangeably used with positive and negative power sources, respectively.

The current supplier 130 includes an amplifying circuit 134 including the amplifying circuit 132 and the amplifying circuit 131 of FIG. 1, a resistor R0, and operational amplifiers OP1 and OP2. In addition, the amplifying circuit 134 further includes a current output circuit 135.

An inverting input terminal (hereinafter referred to as a negative input terminal) indicated by '–' of the operational amplifier OP1 is connected to an output terminal of the operational amplifier OP1. In addition, a non-inverting input terminal (hereinafter referred to as a positive input terminal) represented by '+' is connected to a terminal of the coupling coil $L2_A$. That is, the coupling voltage $V_L$ produced across the coupling coil $L2_A$ is input to the operational amplifier OP1.

The operational amplifier OP1 includes a voltage follower circuit having an amplification factor 1, increases the input impedance, and separates the circuits. Here, the output of the operational amplifier OP1 is also denoted by the coupling voltage $V_L$.

The negative input terminal of the operational amplifier OP2 is connected to the output terminal of the operational amplifier OP2. In addition, the positive input terminal is connected to a terminal of the detection coil $L1_A$. That is, the detection voltage VCT produced across the detection coil $L1_A$ is input to the operational amplifier OP2. The operational amplifier OP2 includes a voltage follower circuit having the amplification factor 1, increases the input impedance, and separates the circuits. Here, the output of the operational amplifier OP2 is also denoted by the detection voltage $V_{CT}$.

The amplifier circuit 134 includes an operational amplifier OP3, resistors R3 to R6, and a current output circuit 135.

The positive input terminal of the operational amplifier OP3 is connected to the output terminal of the operational amplifier OP2 through the resistor R3 and connected to the output terminal of the operational amplifier OP1 through the resistor R4. The negative input terminal of the operational amplifier OP3 is grounded through the resistor R5 and connected to the output terminal of the operational amplifier OP3 through the resistor R6.

In other words, the operational amplifier OP3 performs a function as a non-inverting amplifier, and a signal obtained by adding the output of the operational amplifier OP1 (combination voltage VL) to the output of the operational amplifier OP2 (detection voltage VCT) may be input to the positive input terminal of the operational amplifier OP3.

The amplification factor (α) in FIG. 1 may be represented by equation (5), and the amplification factor (β) may be represented by equation (6). Then, the resistors $R_2$, $R_3$, R4, R5, and R6 are set to have the amplification factor β become 1.

$$\alpha = \left(\frac{R_5 + R_6}{R_3 + R_4}\right) \cdot \frac{R_5}{R_4} \quad (5)$$

$$\beta = \left(\frac{R_5 + R_6}{R_2 + R_4}\right) \cdot \frac{R_3}{R_5} \quad (6)$$

The current output circuit 135 includes an operational amplifier OP4, a plurality of switch elements, and resistors $R_7$ to $R_{16}$. Here, the plurality of switch elements include pnp bipolar transistors Tr1 and Tr2 (hereinafter referred to as transistors pnp Tr1 and pnpTr2) and npn bipolar transistors Tr1 and Tr2 (hereinafter referred to as transistors npnTr1 and npnTr2).

The positive input terminal of the operational amplifier OP4 may be connected to the output terminal of the operational amplifier OP3. The negative input terminal of the operational amplifier OP4 may be connected to an output terminal of the current output circuit 135 (a connection point between the resistor $R_{15}$ and the resistor $R_{16}$ as will be described later). The operational amplifier OP4 includes a voltage follower circuit and outputs a voltage at an amplification factor of 1. That is, the operational amplifier OP4 increases the input impedance and separates the circuits.

The collector of the transistor pnpTr1 is connected to the collector of the transistor npnTr1. In addition, the emitter of the transistor npnTr2 is connected to the emitter of the transistor pnpTr2.

The base of the transistor pnpTr1 is connected to the output terminal of the operational amplifier OP4 via the resistor $R_7$ and to the power source +V through the resistor $R_8$. The base of the transistor npnTr1 is connected to the output terminal of the operational amplifier OP4 through the resistor $R_9$ and to the power source −V through the resistor $R_{10}$.

The emitter of the transistor pnpTr1 is connected to the base of the transistor npnTr2 via the resistor $R_{11}$ and to the power supply +V through the resistor $R_{12}$. The emitter of the transistor npnTr1 is connected to the base of the transistor pnpTr2 through the resistor $R_{13}$ and to the power source −V through the resistor $R_{14}$.

The emitter of the transistor npnTr2 is connected to the emitter of the transistor pnpTr2 through the resistors $R_{15}$ and $R_{16}$. The collector of the transistor npnTr2 is connected to the power source +V. The collector of the transistor pnpTr2 is connected to the power source −V.

A terminal of the resistor $R_0$ is connected to the connection point between the resistor $R_{15}$ and the resistor $R_{16}$ and is connected to the negative input terminal of the operational amplifier OP4. The other terminal of the resistor $R_0$ is connected to one terminal of the coupling coil $L2_A$.

Hereinafter, the operation of the current supplier 130 will be described.

The detection voltage $V_{CT}$ produced across the detection coil $L1_A$ by the common mode noise current flowing through the power line 140 is input to the operational amplifier OP2 with the amplification factor 1.

On the other hand, the coupling voltage $V_L$ produced across the coupling coil $L2_A$ is input to the operational amplifier OP1 with the amplification factor 1. Here, the output of the operational amplifier OP1 is also denoted by the coupling voltage $V_L$.

The detection voltage $V_{CT}$ and the coupling voltage $V_L$ applied through the resistors $R_3$ and $R_4$, respectively, are combined in the amplifying circuit 134, and the combined voltage is input to the operational amplifier OP3.

The output of the operational amplifier OP3 is input to the positive input terminal of the operational amplifier OP4. The output of the operational amplifier OP4 is input to the base of each of the transistors pnpTr1 and npnTr1. Then, each of the transistors pnpTr1 and npnTr1 is always in an on state. Here, each on state (on resistance) may be set according to the output of the operational amplifier OP4.

Thus, a current path through the resistor $R_{12}$, the transistor pnpTr1, the transistor npnTr1, and the resistor $R_{14}$ is formed. Then, the voltage at a connection point between the resistor $R_{12}$ and the emitter of the transistor pnpTr1 and the voltage at a connection point between the emitter of the transistor npnTr1 and the resistor $R_{14}$ are set.

That is, a circuit including the transistors pnpTr1, the transistors npnTr1, and the resistors $R_7$, $R_8$, $R_9$, and $R_{10}$ are provided to improve output waveform distortion of the operational amplifier OP4. When the output waveform distortion of the operational amplifier OP4 is trivial, the circuit for improving the output waveform distortion of the operational amplifier OP4 may be omitted.

The transistor npnTr2 and the transistor ppnTr2 constitute a push-pull circuit. Therefore, when both the base of the transistor npnTr2 and the base of the transistor ppnTr2 become positive, the transistor npnTr2 is turned on and the transistor pnpTr2 is turned off. As a result, the current $I_0$ flows from the power source +V to the ground via the transistor npnTr2, the resistor $R_{15}$, the resistor $R_0$, and the coupling coil $L2_A$.

On the contrary, when the base of the transistor npnTr2 and the base of the transistor ppnTr2 are both negative, the transistor npnTr2 is turned off and the transistor ppnTr2 is turned on. As a result, a current path from the ground to the power source −V is formed via the coupling coil $L2_A$, the resistor $R_0$, the resistor $R_{16}$, and the transistor pnpTr2.

The circuit diagram of the current supplier 130 shown in FIG. 2 is an example, and the current supplier 130 may be implemented with other circuit configurations. For example, the current supplier 130 may be implemented with a circuit that applies a current from the current source to the coupling coil $L2_A$ while feeding back the voltage produced across the coupling coil $L2_A$.

Figure 3:
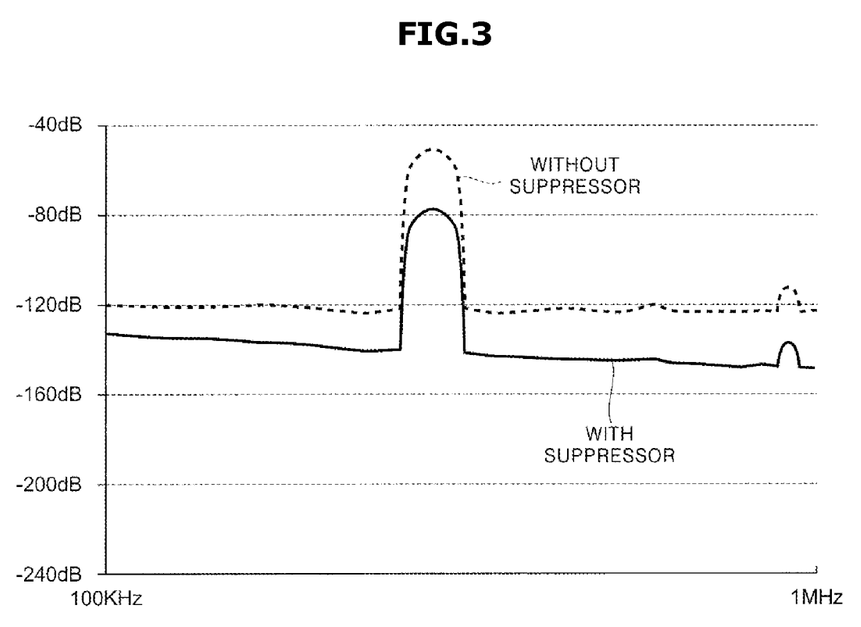
FIG. 3 is a view for explaining suppression effect on common mode noise.

FIG. 3 is a view for explaining a suppression effect of the common mode noise.

FIG. 3 shows effects of suppressing the common mode noise when the suppressor 100 shown in FIG. 2 is provided (with suppressor) and when the suppressor 100 is not provided (without suppressor). The horizontal axis represents frequency and the vertical axis represents noise levels.

As shown in FIG. 2, the suppressor 100 was simulated and the suppression effect of the common mode noise was examined. At this time, a circuit for generating a 300 kHz signal was used as the noise source.

As shown in FIG. 3, with the suppressor 100, a noise level of 300 kHz may be reduced by 25.8 dB.

Mode for Invention

A Second Embodiment

The motor device 1 of the first embodiment as shown in FIG. 1 receives an AC current from the AC power supply 2 of a three-phase four-wire system. However, motor device 1 of the second embodiment receives an AC current from the AC power supply 2 of a three-phase three-wire system.

Figure 4:
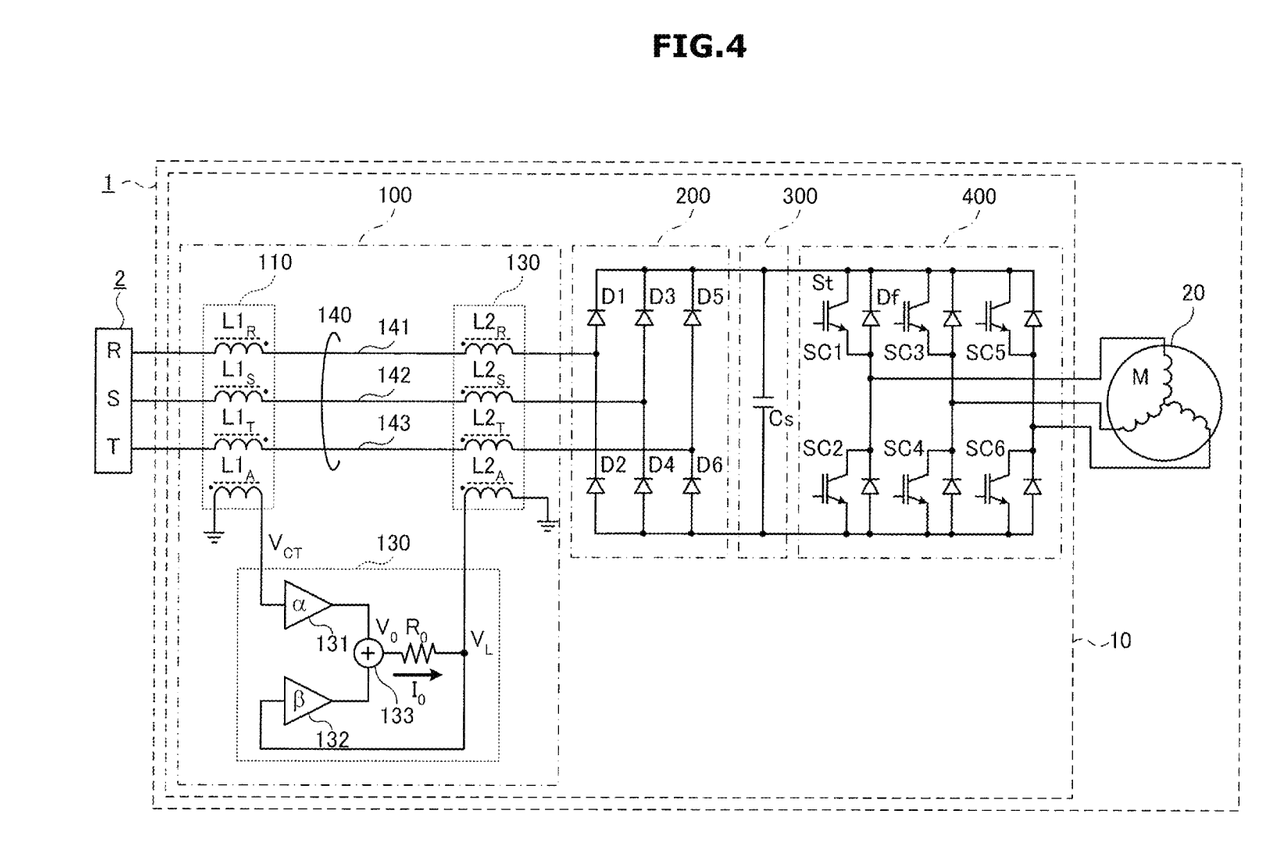
FIG. 4 illustrates a motor device in accordance with another embodiment of the disclosure.

FIG. 4 illustrates a motor device 1 in accordance with a second embodiment of the disclosure.

As shown in FIG. 4, the motor device 1 of the second embodiment does not include the N-phase power supply line 144 for the motor device 1 of FIG. 1. That is, the second embodiment or the motor device 1 include a three-phase three-wire AC power supply 2.

The remaining components of the motor device 1 are the same as those in the motor device 1 according to the first embodiment of the disclosure as shown in FIG. 1, and given the same reference numerals as those of the motor device 1, so the description thereof will be omitted.

Even in the motor device 1 using the three-phase three-wire AC power supply 2, as described in the first embodiment, the suppressor 100 may suppress the conductive noise.

A Third Embodiment

The motor device 1 according to the first embodiment of the disclosure and the motor device 1 according to the second embodiment of the disclosure receive an AC current from the three phase AC power supply 2.

Figure 5:
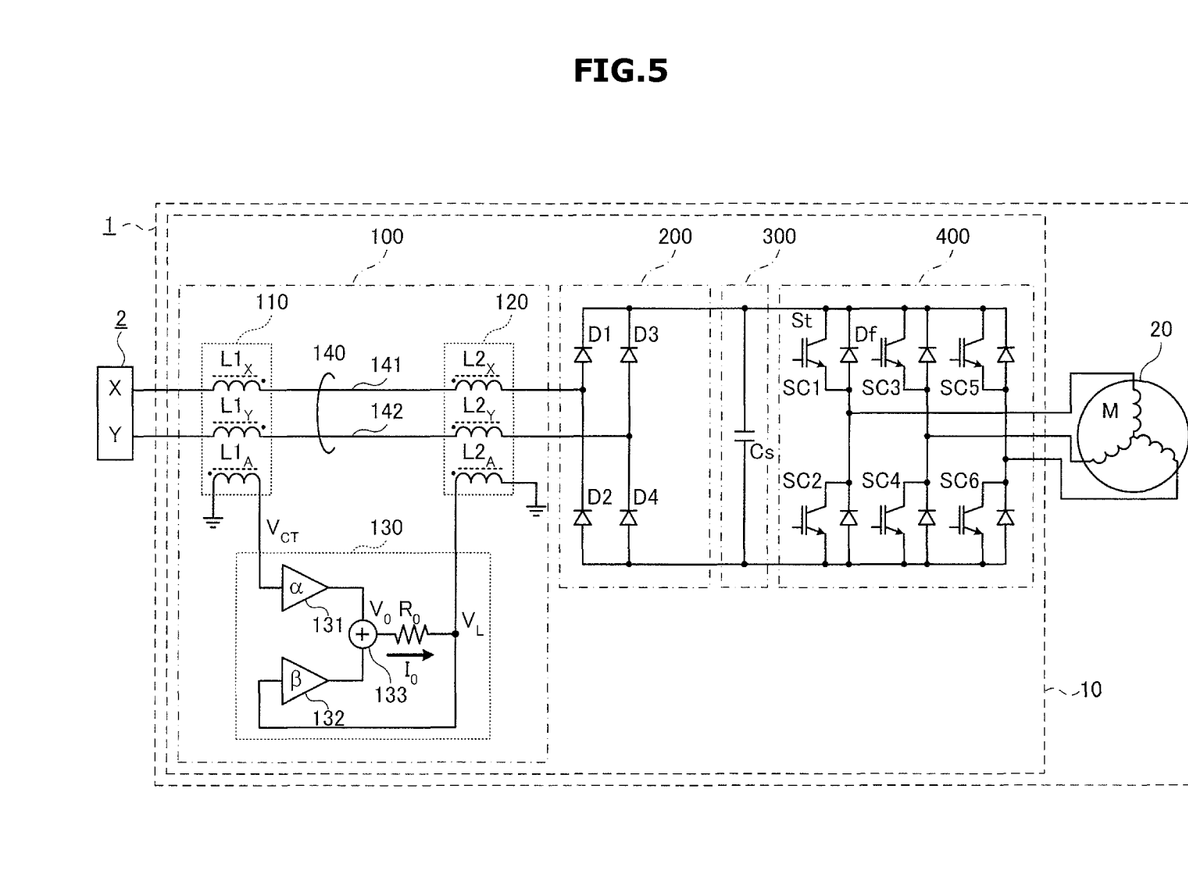
FIG. 5 illustrates a motor device in accordance with another embodiment.

FIG. 5 illustrates a motor device in accordance with a third embodiment of the disclosure.

As shown in FIG. 5, the motor device 1 according to the third embodiment has an X phase and a Y phase instead of the R phase and the S phase of the motor device 1 as shown in FIG. 1, and does not have the T phase and the N phase.

The rectifier 200 includes four rectifying diodes D1 to D4. That is, the AC power supply 2 supplies single-phase two-wire power.

The remaining components of the motor device 1 are the same as those of the motor device 1 according to the first embodiment as shown in FIG. 1. Accordingly, the same reference numerals are given to the components and the description thereof will be omitted. In addition, R is substituted with X, and S is substituted with Y.

Even in the motor device 1 using the single-phase two-wire AC power supply 2, as described in the first embodiment of the disclosure, the suppressor 100 may suppress the conductive noise.

The motor device 1 or the power converter 10 according to the first to third embodiments of the disclosure includes the suppressor 100 installed between the AC power supply 2 and the rectifier 200. It is also possible to have the suppressor 100 installed between the inverter 400 and the motor 20.

It is also possible to install the suppressor 100 on a power line for supplying an AC current between the inverter 400 and the motor 20.

The motor device 1 and the power converter 10 in the first to third embodiments of the disclosure are an example. For example, the motor device 1 may also include other electronic components (a resistor, a capacitor, a coil, etc.) or a circuit other than what are described above.

In the first, second and third embodiments of the disclosure, the suppressor 100 for suppressing the conductive noise of the motor device 1 and the power converter 10 has been described. However, the suppressor 100 for suppressing the conductive noise may also be applied to any other devices that make conductive noise.

In addition, various modifications and combinations of the embodiments may be made without departing from the spirit of the disclosure.

The invention claimed is:

1. A motor device comprising:
 a power converter configured to:
  generate a direct current (DC) by rectifying and smoothing alternating current (AC) of an AC power source,
  convert the generated DC into an AC by performing switching operation, and
  output the converted AC to a motor; and
 a conductive noise suppressor installed between the AC power source and the power converter and configured to:
  reduce a noise current in a common mode flowing through a power line for supplying the AC of the AC power source, and
  supply the AC with the reduced noise current in the common mode to the power converter,
 wherein the conductive noise suppressor includes:
  a current detector configured to detect a noise current flowing through the power line,
  a noise suppressor configured to supply a current to reduce the noise current, and
  a current supplier configured to set a current to be supplied to the noise suppressor based on the detected noise current and a voltage across the noise suppressor, and supply the set current to the noise suppressor,
  wherein the current detector includes a first coil part connected in series to the power line of the AC power source, and a detection coil magnetically coupled to the first coil part, and
  wherein the noise suppressor includes a second coil part connected in series to the power line, and a coupling coil magnetically coupled to the second coil part, and reduces the noise current flowing through the power line by inducing the current supplied to the coupling coil to the second coil part.

2. The motor device of claim 1, wherein:
 the current detector further includes a resistor connected between both ends of the detection coil and configured to convert a current flowing in the detection coil into a voltage, and
 the noise suppressor further includes a resistor installed between both ends of the coupling coil and configured to convert a current flowing in the coupling coil into a voltage.

3. The motor device of claim 1, wherein:
 the current detector further includes a resistor connected between both ends of the detection coil and configured to convert a current flowing in the detection coil into a voltage, and
 the noise suppressor further includes a snubber circuit installed between both ends of the coupling coil, and configured to supply a current corresponding to a voltage at a connection point between the coupling coil and the snubber circuit to the coupling coil, wherein the snubber circuit includes a resistor and a capacitor connected in series between both ends of the coupling coil.

4. The motor device of claim 1, wherein the power converter includes:
 a rectifier configured to rectify an AC supplied through the conductive noise suppressor into a ripple current;
 a smoother connected to the rectifier and configured to generate a DC by smoothing the ripple current; and
 an inverter connected to the smoother and configured to convert the DC to an AC current by performing switching operation and outputting the converted AC to a load.

5. The motor device of claim 1, wherein the AC power source comprises a three phase four wire AC power source, a three phase three wire AC power source, or a single phase two wire AC power source.

6. A conductive noise suppressor comprising:
 a current detector configured to detect a noise current flowing through a power line supplying an alternating current (AC);
 a noise suppressor configured to include a coil connected to the power line in series and a coupling coil magnetically coupled to the coil, and reduce the noise current flowing through the power line by causing a current supplied to the coupling coil to be induced to the coil; and
 a current supplier configured to set a current to be supplied to the coupling coil based on a voltage corresponding to the noise current detected by the current detector and a voltage across the coupling coil and supply the set current to the coupling coil,
 wherein the current detector includes:
  a coil connected adjacently with an AC power source and connected in series with the power line, and
  a detection coil magnetically coupled to the coil of the current detector and configured to detect the noise current in a common mode.

7. The conductive noise suppressor of claim 6, wherein:
 the noise suppressor further includes a snubber circuit installed between both ends of the coupling coil, and configured to supply a current corresponding to a voltage at a connection point between the coupling coil and the snubber circuit to the coupling coil, wherein the snubber circuit includes a resistor and a capacitor connected in series between both ends of the detection coil.

8. The conductive noise suppressor of claim 6, wherein the noise suppressor is configured to change impedance of the power line by causing the current induced by the coil to be superposed on the current of the AC power source flowing through the power line.

9. The conductive noise suppressor of claim 6, wherein the current detector further includes a resistor connected between both ends of the detection coil, and configured to convert a current flowing in the detection coil into a voltage.

10. The conductive noise suppressor of claim 6, wherein the current detector further includes an operational amplifier configured to add a voltage across the detection coil to a voltage across the coupling coil.

11. The conductive noise suppressor of claim 6, wherein the current supplier further includes:
- a current path configured to apply a voltage generated by the coupling coil, and
- a current output circuit including a plurality of switch elements configured to form a current path for supplying current to the coupling coil.

12. A power converter comprising:
- a suppressor configured to reduce a noise current in a common mode flowing through a power line for supplying alternating current (AC);
- a rectifier configured to rectify the AC supplied through the suppressor into a ripple current;
- a smoother connected to the rectifier for generating a direct current (DC) by smoothing the ripple current; and
- an inverter connected to the smoother and configured to convert the DC to an AC by performing switching operation and output the converted AC to a load,
wherein the suppressor includes:
- a current detector configured to detect a noise current flowing through the power line,
- a noise suppressor configured to supply a current to reduce the noise current, and
- a current supplier configured to set a current to be supplied to the noise suppressor based on the detected noise current and a voltage across the noise suppressor and supply the set current to the noise suppressor,
wherein the current detector includes a first coil part connected in series to the power line of an AC power source, and a detection coil magnetically coupled to the first coil part, and
wherein the noise suppressor includes a second coil part connected in series to the power line, and a coupling coil magnetically coupled to the second coil part, and configured to reduce the noise current flowing through the power line by causing the current supplied to the coupling coil to be induced to the second coil part.

13. The power converter of claim 12, wherein:
the current detector further includes a resistor connected between both ends of the detection coil configured to convert a current flowing through the detection coil into a voltage; and
the noise suppressor further includes a snubber circuit installed between both ends of the coupling coil, and configured to supply a current corresponding to a voltage at a connection point between the coupling coil and the snubber circuit to the coupling coil, wherein the snubber circuit includes a resistor and a capacitor connected in series between both ends of the coupling coil.

14. The power converter of claim 12, wherein the current supplier further includes:
- a current path configured to apply a voltage generated by the coupling coil, and
- a current output circuit including a plurality of switch elements configured to form a current path for supplying a current to the coupling coil.

* * * * *